Figure 1:
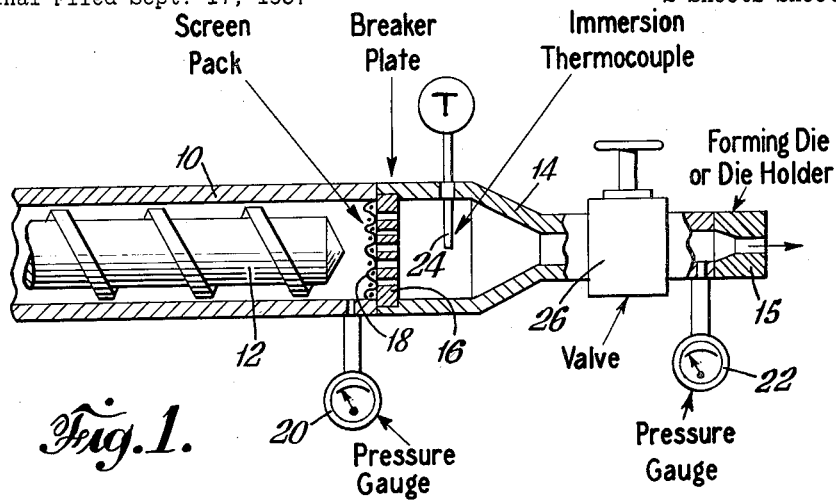

May 8, 1962  B. H. MADDOCK  3,032,822
EXTRUSION CONTROL

Original Filed Sept. 17, 1957  2 Sheets-Sheet 1

INVENTOR.
BRUCE H. MADDOCK
BY Richard S. Shreve Jr.
ATTORNEY

INVENTOR.
BRUCE H. MADDOCK

United States Patent Office 3,032,822
Patented May 8, 1962

3,032,822
EXTRUSION CONTROL
Bruce H. Maddock, Fanwood, N.J., assignor to Union
Carbide Corporation, a corporation of New York
Continuation of application Ser. No. 684,586, Sept. 17,
1957. This application May 5, 1959, Ser. No. 811,046
8 Claims. (Cl. 18—55)

This invention relates to extrusion control, and more particularly to a method of controlling pressure in the extruder in such manner that quality of the extruded product is improved and the extrusion rate is increased.

The degree of mixing accomplished in screw extrusion of thermoplastic materials is a function of the screw design, the rheological properties of the material and the extruder operating conditions. For a given screw and material it can be shown that many quality aspects of the extruded product depend upon the mixing efficiency and that the mixing, in turn, is improved by increasing the pressure at the end of the screw, this pressure causing an increase in back flow through the screw channel with a resultant increase in mechanical shearing action. Optimum quality is therefore achieved by proper control of the extrusion pressure.

In the majority of conventional extrusion applications, the resistance offered by the forming die does not create sufficient pressure to accomplish good mixing in the screw channel and it is common practice to introduce a series of fine mesh screens at the end of the screw in an effort to develop additional pressure. This is only partially successful since it is difficult to create any substantial pressure by this method without resorting to a large number of extremely fine mesh screens (eight to twelve 250 mesh screens, for example). In addition, the fine mesh screens tend to clog quickly, necessitating frequent shutdown for replacement.

In practice, the size and number of screens is usually compromised to give a reasonable running time before shut-down is necessary. In many cases, either the product quality must also be compromised due to lack of adequate pressure, or the output must be limited to a rate at which a satisfactory quality can be maintained. This limit is often reached at a screw speed and power consumption well below the design capacity of the extruder. In other words, the extruder cannot be run at full inherent capacity due to the mixing limitation of the screw and inability to operate in the optimum pressure region.

By inserting a valve and one or more pressure gauges between the extruder screw and the die, the pressure can easily be adjusted to the value necessary for efficient mixing in the screw. This provides a continuous method of quality control as opposed to the "hit and miss" use of screen packs or fixed restricting orifices, although a certain minimum amount of screening (one 20 and one 60 mesh, for example) is usually desirable to remove possible foreign contaminants. When the maximum screw speed and output rate for a given quality level are reached, it is found that by reducing the valve opening the pressure can be increased to improve the mixing action and therefore the quality.

A surprising and novel feature of the invention is that whereas the output rate is reduced by the increased pressure, the screw speed can then be raised to give an output rate at the original quality level significantly higher than the original rate. In fact, by simultaneously increasing both the pressure and the screw speed it is possible, eventually, to achieve quality production at the maximum screw speed of the machine, thereby realizing the inherent delivery capacity of the system. This method also provides a ready means for establishing optimum pressure conditions for each specific application or product and for day to day duplication of these conditions. In addition, the quality of the product is always under direct and continuous control of the operator.

Figure 2:
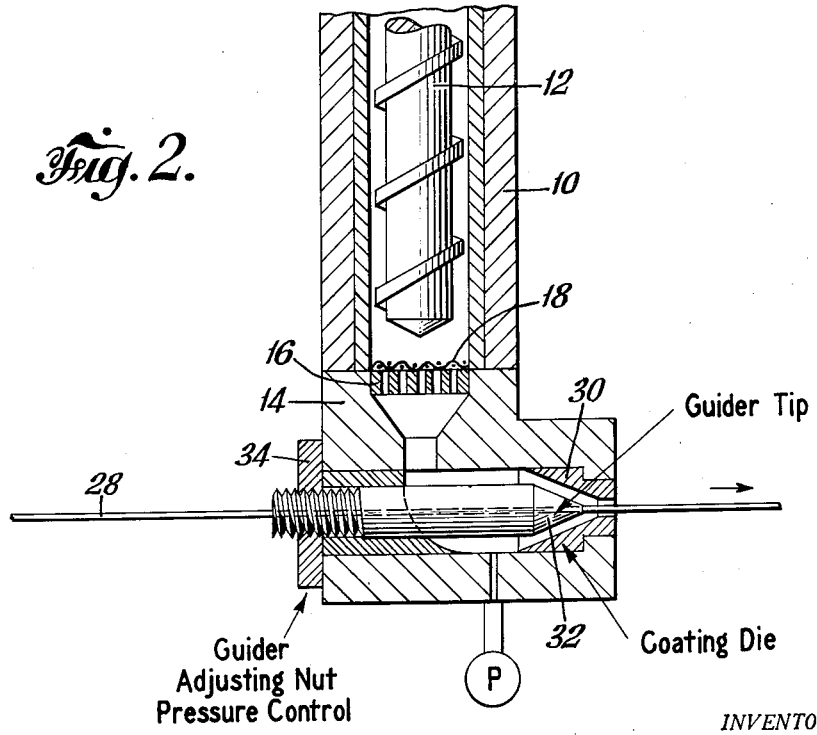
Figure 3:
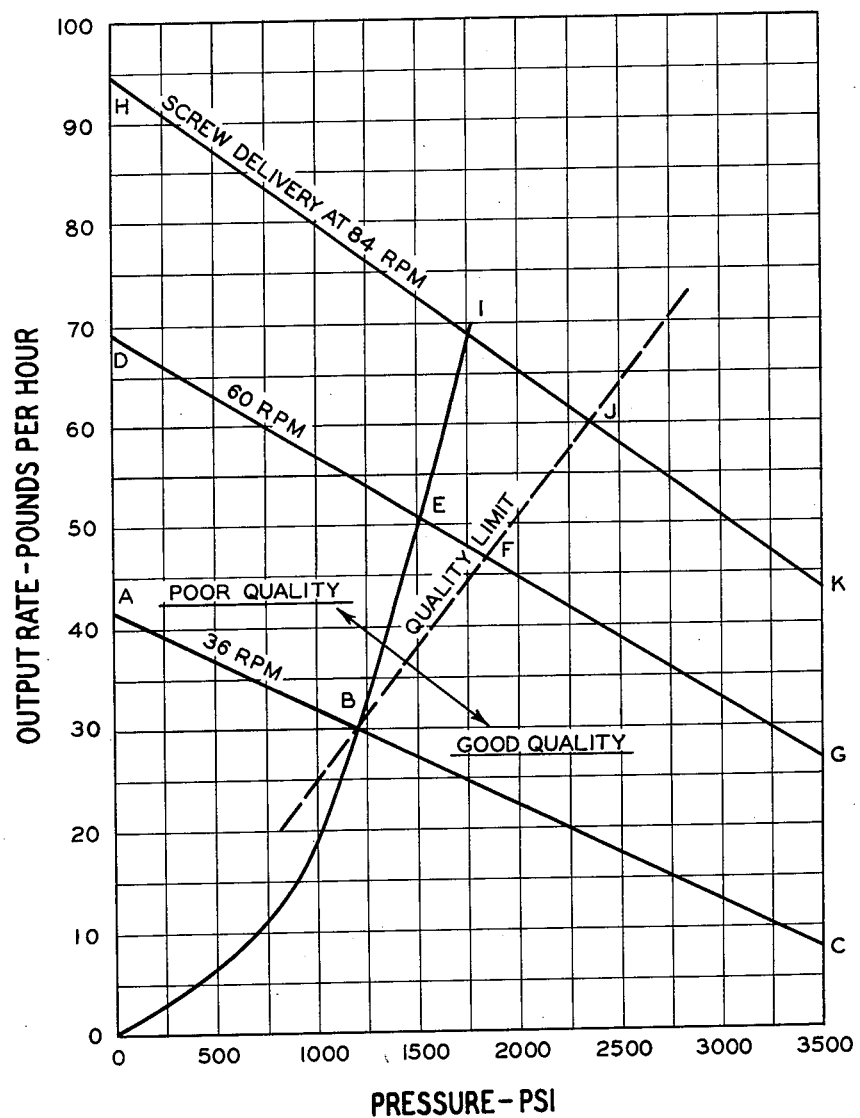

In the drawings:
FIG. 1 is a cross section through apparatus for carrying out the present invention;
FIG. 2 is a cross section through a modified apparatus; and
FIG. 3 is a set of curves for pressure-quality-output rate relation in extrusion.

The apparatus shown comprises an extruder containing a barrel section 10 having a rotatable extruder screw 12 therewithin, a head section 14 and a forming die 15. A breaker plate 16 and a screen pack 18 are mounted between the barrel 10 and the head 14 ahead of the screw 12. Pressure gauges 20 and 22 are respectively mounted on each side of the breaker plate-screen pack assembly. The most informative, hence preferred, location for said gauge is immediately forward of the extruder screw tip, as illustrated by gauge 20 in FIG. 1. Said gauge may, however, be placed in other locations as illustrated, for example, by gauge P in FIG. 2.

When a second gauge is installed, it is preferably located, as illustrated by gauge 22 in FIG. 1, between the valve 26 and the die 15, in which location the gauge reflects the resistance or back pressure caused by the extrusion die itself. An immersion thermocouple 24 is mounted in the head 14.

An adjustable orifice shown as a valve 26 is interposed between the screw 12 and the die 15 to raise the pressure in the extruder barrel above that caused by the die itself, to improve the quality of the extruded product and to increase the extrusion rate at which good quality product can be produced.

In the form shown in FIG. 2 for coating wire 28, a coating die 30 is mounted, at an angle to the extruder screw 12, in the head 14. The adjustable orifice comprises a guider tip 32 adjustable toward or away from the conical interior of the die 30 by an adjusting nut 34; and the pressure within the extruder registers on pressure gauge P.

The process of this invention makes its possible to determine and utilize the optimum range of operating conditions for a given extrusion system. This is illustrated in FIG. 3 for a typical 2.0" diameter extruder extruding 2.0 melt index polyethylene at a temperature of 180° C. Lines AC, DG and HK represent the screw delivery as a function of the pressure measured by gauge 20 in FIG. 1, at screw speeds of 36, 60 and 84 r.p.m., respectively, the last mentioned being the maximum screw speed of the machine. Curve BEI is a characteristic rate versus pressure curve for an extrusion die having a diameter of 0.100" and a length of 0.500". Broken line BFJ is the boundary between regions of acceptable and unacceptable quality production.

It is seen that satisfactory quality would be achieved at point B with a screw speed of 36 r.p.m., a pressure of 1200 p.s.i. and a rate of 30 pounds per hour. Any attempt to increase the screw speed and output rate toward points E and I results in quality degradation. However, by means of a valve between the extruder screw and the extrusion die, it was possible to increase the pressure and screw speed simultaneously to point J and thereby achieve satisfactory quality at the maximum screw speed at a pressure of 2350 p.s.i. with an extrusion rate of 60 pounds per hour. The output rate of good quality product was thus doubled and the full capacity of the system realized.

For dies of lower resistance (larger cross-sectional area or shorter length), the die characteristic curve would fall to the left of the one shown in FIG. 3 so that a still greater increase in pressure would be necessary to move into the good quality operating region. For higher resistance (smaller) dies, normal extrusion would occur in the good quality region and additional pressure might not be necessary; but applications involving such high resistance dies are in the minority.

The valving action for control of the pressure can be accomplished at any point between the extruder screw and the die orifice and need not necessarily be a separate valve. In a wire coating crosshead, for example, the clearance between the wire guider tip and the die could be adjusted to provide the desired restriction or valve effect. This is illustrated in FIG. 2. Similar types of continuously adjustable restricting or valving devices could be incorporated into the design of other extrusion heads or die assemblies.

The following additional examples further illustrate the use of a valve according to the method of instant invention to improve the output rate and quality of extruded products. It is to be understood, however, that the process of this invention can also be used advantageously for all other extrudable compositions.

*Example I*

Using conventional wire insulating techniques, a 0.032″ wall of polyethylene having a melt index of 2.0 was coated on a No. 14 AWG solid conductor at 170° C. with a conventional 2.0″ diameter extruder. Insulation having a smooth surface was obtained at a maximum extrusion rate of 23 pounds per hour, at which rate the screw speed was 35 r.p.m. and the resin pressure 2300 p.s.i. Any further increase in screw speed resulted in surface roughness. By increasing the pressure to 4800 p.s.i. by means of a valve and the screw speed to 70 r.p.m., smooth surface wire was produced at a rate of 35 pounds per hour. This increase in pressure and output rate would not have been possible by introduction of additional screens in the conventional manner.

*Example II*

A mixture consisting of 95% natural polyethylene pellets having a melt index of 2.0 and 5% of red pigmented polyethylene of the same melt index was extruded at 180° C. in the conventional manner with a 2.0″ diameter extruder. Good color dispersion was obtained at a maximum rate of 33 pounds per hour with a screw speed of 36 r.p.m. and a pressure of 1400 p.s.i. Further increases in screw speed resulted in impaired color dispersion and surface roughness. By means of a valve between the extruder and the die it was possible to raise the pressure to 2600 p.s.i. and the screw speed to 84 r.p.m., the maximum speed of the machine, under which conditions good color dispersion was obtained at a rate of 65 pounds per hour.

*Example III*

A mixture consisting of 5 parts by weight of uncolored, impact grade, rubber modified polystyrene composition (Bakelite Company's "TDG–5001 natural-15″") and 1.5 parts of weight of a red, impact grade, rubber modified polystyrene composition (Bakelite Company's "TDG–5001 red-25″") was made by tumbling the pellets together for 10 to 15 minutes and said mixture was then charged to the hopper of a 2.5 inch diameter intruder and extruded into 12 inch wide by 50 mil thick sheet. The barrel sections of the extruder were maintained at 360, 380 and 400° F., respectively, from rear to front, and the die at 400° F. When the extruder was operated in the conventional manner, acceptable quality sheet was obtained at a maximum rate of 85 pounds per hour with a screw speed of 60 r.p.m. and a pressure of 1800 p.s.i. and using a special extruder screw equipped with a mixing head attachment. At higher screw speeds the surface of the sheet became irregular, i.e., wavy, and color dispersion was unsatisfactory, i.e., red streaks and color deficient areas were present. When a valve was inserted between the extruder screw tip and the extrusion die and the pressure was raised to 3000–3500 p.s.i. by partially closing said valve, uniformly red colored, smooth surfaced sheet which was fully satisfactory in all respects was obtained at a rate of 140 pounds per hour with a screw speed of 105 r.p.m., the maximum screw speed of which the machine was capable, even with the standard extruder screw.

A thermoplastic resin may be compounded into a great many different compositions containing an almost innumerable variety of modifiers such as other resins, fillers, plasticizers, colorants, stabilizers, processing aids, lubricants, etc. designed to provide optimum properties for the particular end-use involved. Desirably, it should be possible to merely dry-blend the several components of such a composition together, i.e., mix them at a temperature insufficient to flux the resin, and then directly extrude the dry-blend. However, this is not generally practicable because so-prepared compositions do not always extrude properly and the extruded product contains "fisheyes," rugose surfaces and other irregularities and imperfections which stem from poor extrudability characteristics and inadequate material homogeneity. It is therefore generally necessary to hot process the composition, i.e., mix and compound the ingredients together at a temperature high enough to flux the resin, as for example in a Banbury mixer or on a two-roll mill or the like, then regranulate it before it can be extruded satisfactorily. In those cases wherein the dry blend can be extruded directly, it is generally necessary to operate at an undesirably low extrusion rate to insure adequate mixing in the extruder and acceptable quality extruded products. Vinyl resin dry-blends are particularly subject to the fore-going deficiencies; and the ability to extrude such dry-blends satisfactorily is therefore particularly limited.

By employing the improved extrusion process of this invention, the scope of dry-blend extrusion is very considerably widened—in two respects. First, dry blends can be extruded directly into good quality products at very appreciably higher rates; and second, the quality of the extruded product is sufficiently up-graded as to make it acceptable for many end uses for which dry-blend extrudates were not previously adequate, and the hot processing and concomitant granulating operation previously needed in such instances can therefore now be eliminated.

This is illustrated by the following example (wherein all parts and percentages are by weight).

*Example IV*

A dry blend consisting of 44% of a high molecular weight polyvinyl chloride resin (Bakelite Company "QYRS"), 16% calcium carbonate, 5% clay, 24% dioctyl phthalate, 9% of Bakelite Company's "Halowax 4004" (a chlorinated mixture of aliphatic hydrocarbons containing about 40% chlorine), 1.75% tribasic lead sulphate and 0.25% tribasic lead stearate was prepared in the following manner. The dry ingredients (resin, fillers and lead salts) were charged to a ribbon blender and mixed therein, without heating, for about 10 minutes. The liquid ingredients (DOP and Halowax) were then added and mixed in with steam circulating through the blender jacket at such a rate that the temperature of the mass rose gradually to 190° F. in 20 minutes. At this point, the steam flow was discontinued and cooling water was circulated through the blender jacket. The cooled mixture, which was a free flowing, dry-appearing, particulate material, was then charged to the hopper of a 2 inch diameter wire coating extruder and extruded into $\frac{1}{32}$ inch thick insulation onto No. 14 wire. The following extrusion conditions were maintained:

Screw—neutral (i.e., no heating or cooling);
Cylinder:
    Rear—330° F.
    Front—360° F.
Head and die—360° F.

When the extruder was operated in the conventional manner, acceptable quality wire insulation was obtained at a maximum rate of 40 pounds per hour with a screw speed of 40 r.p.m. and a pressure of about 1600 p.s.i. As the screw speed was progressively increased, i.e., above 40 r.p.m., coating thickness became variable, then the coating became visibly undulate and its surface rugose, and finally "fisheyes" were apparent therein, also. When a valve was inserted between the extruder screw tip and the extrusion die and the pressure was raised to 2300 p.s.i. by partially closing said valve, wire insulation entirely devoid of the above named deficiencies and fully satisfactorily in all respects was obtained even when the machine was operated at its maximum screw speed, 114 r.p.m., which gave an extrusion rate of 80 pounds per hour.

This application is a continuation of application Serial No. 684,586, filed September 17, 1957.

What is claimed is:

1. Method of extruding compositions with an extruder containing a barrel having a rotatable extrusion screw therewithin, a forming die, and an adjustable orifice between said screw and die, and which produces satisfactory quality of extruded products at screw speeds below a critical speed, and in which any increase in speed above said critical speed results in quality degradation, which comprises operating the screw at higher than said critical quality degradation speed, reducing the cross-sectional area of said orifice to raise the pressure and improve the quality of the extruded product, and maintaining said higher speed and said smaller cross sectional area throughout the production run.

2. Method of extruding compositions with an extruder containing a barrel having a rotatable extrusion screw therewithin, a forming die, and an adjustable orifice between said screw and die, and which produces satisfactory quality of extruded products at screw speeds below a critical speed, and in which any increase in speed above said critical speed results in quality degradation, which comprises reducing the cross-sectional area of said orifice to raise the pressure in the extruder barrel above that caused by the die itself to improve the quality of the extruded product, increasing the speed of the extruder screw to compensate for the reduction in cross-sectional area of said orifice and restore the extrusion rate through the die to at least that without such orifice reduction, and maintaining said increased speed and said reduced cross sectional area throughout the production run.

3. Method of extruding compositions with an extruder containing a barrel having a rotatable extrusion screw therewithin, a forming die, and an adjustable orifice between said screw and die, and which at the maximum cross-sectional area of said orifice produces satisfactory extruded products at screw speeds below a critical speed, and in which any increase in speed above said critical speed with said maximum cross-sectional area results in quality degradation of the extruded product, which comprises operating the extrusion screw at a speed higher than said critical quality degradation speed, operating the adjustable orifice at a cross-sectional area smaller than said maximum cross-sectional area, and maintaining said higher speed and said smaller cross-sectional area throughout the production run.

4. Method of extruding compositions with an extruder containing a barrel having a rotatable extrusion screw therewithin, a forming die, and an adjustable orifice between said screw and die, and which at the maximum cross-sectional area of said orifice produces satisfactory extruded products at screw speeds below a critical speed, and in which any increase in speed above said critical speed results in quality degradation of the extruded product, which comprises operating the adjustable orifice at a cross-sectional area smaller than said maximum cross-sectional area, operating the extrusion screw at a speed higher than said critical quality degradation speed, and maintaining said smaller cross-sectional area and said higher screw speed throughout the production run.

5. Method of extruding compositions with an extruder containing a barrel having a rotatable extrusion screw therewithin, a forming die and an adjustable orifice between said screw and die and which produces satisfactory quality of extruded products at screw speeds below a critical speed, and in which any increase in speed above said critical speed results in quality degradation, which comprises operating said screw at a speed increased above said critical speed, reducing the cross-sectional area of said orifice to raise the pressure in the extruder barrel above that caused by the die itself sufficiently to restore the quality of the extruded product, further increasing the speed of the extruder screw to compensate for the reduction in cross-sectional area of said orifice and restore the extrusion rate through the die to at least that without such orifice reduction, and maintaining said further increased speed and reduced cross-sectional area throughout the production run.

6. Method as claimed in claim 2 in which the compositions extruded are plastics, and the extrusion rate is increased while maintaining at least as good quality as that without such increase.

7. Method as claimed in claim 2 in which the compositions extruded are plastics, and the quality and rate of extrusion are simultaneously improved.

8. Method as claimed in claim 2 in which the compositions extruded are of at least one resin selected from the group consisting of polyethylene, polystyrene, and polyvinyl chloride.

References Cited in the file of this patent

UNITED STATES PATENTS

| | | |
|---|---|---|
| 2,246,149 | Troche et al. | June 17, 1941 |
| 2,760,227 | Andy | Aug. 28, 1956 |